UNITED STATES PATENT OFFICE.

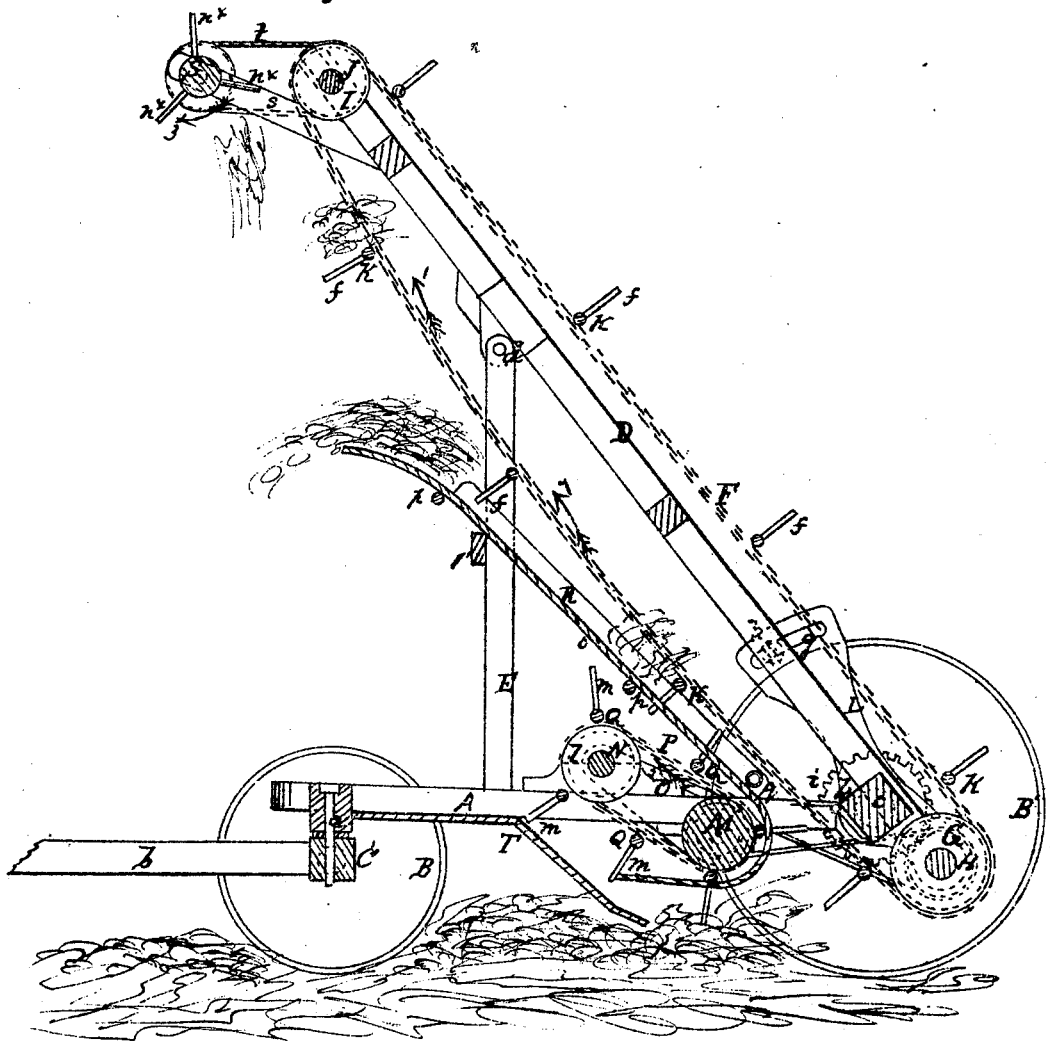

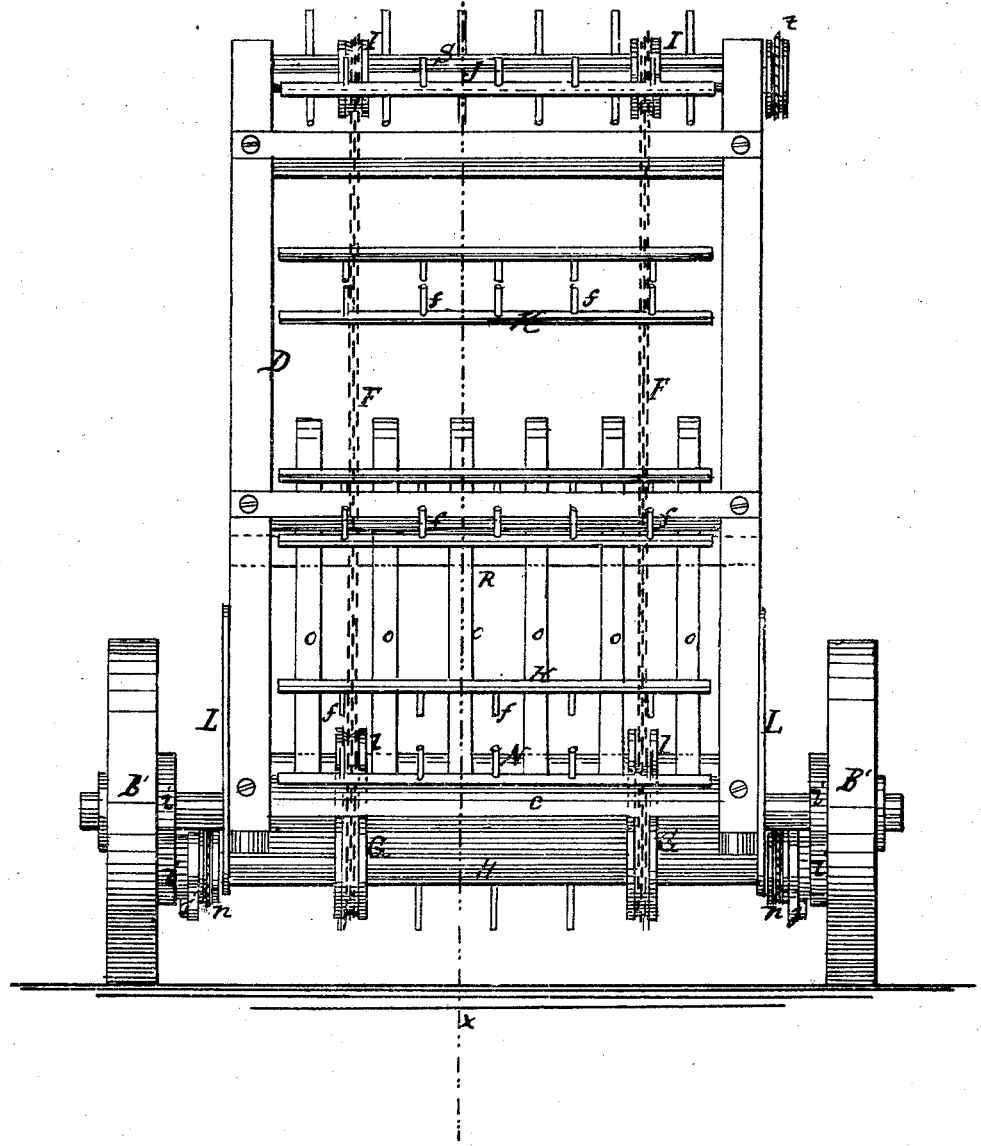

HOSEA WILLARD, OF VERGENNES, VERMONT.

IMPROVEMENT IN MACHINES FOR RAKING AND LOADING HAY.

Specification forming part of Letters Patent No. 57,421, dated August 21, 1866.

*To all whom it may concern:*

Be it known that I, HOSEA WILLARD, of Vergennes, Addison county, State of Vermont, have invented a new and Improved Hay-Loading Device; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\ x$ Fig. 2; and Fig. 2, a rear elevation of the same.

Similar letters of reference indicate like parts.

This invention relates to a new and improved attachment to be applied to wagons or carts for the purpose of loading the same with hay as they are drawn over the field, and thereby avoiding the manual labor of pitching and raking the hay up into cocks. Various devices for this purpose have been devised; but they have not been generally adopted, on account of being cumbersome, liable to get out of order, and incapable of being adjusted so as to rake nearer to or farther from the surface of the ground, as occasion may require, and admitting of the hay, during its elevation from the ground onto the wagon or cart, being scattered by the wind—difficulties which it is believed are fully obviated by my invention.

A represents a horizontal frame, which is supported by or mounted upon four wheels, B B B' B', the front wheels, B, being on an axle, C, which is connected to the front part of frame A by a king-bolt, $a$, said axle having a short draft-pole, $b$, attached to it, by which the device is secured to the rear end of the wagon or cart.

D represents an inclined frame, which is permanently secured to the axle $c$ of the rear wheels, and is supported at the proper degree of elevation by uprights E, the upper ends of which are connected by joints $d$ to the frame D, and the lower ends provided with tenons to fit into mortises in the sides of the horizontal frame A, the lower ends of the uprights being secured to said frame by hooks.

F F represent endless chains, which pass around pulleys G on a shaft, H, at the rear of the axle $c$, and around pulleys I on a shaft, J, in the upper end of the frame D. These chains F F are connected by rods K, provided with teeth $f$. The shaft H has its bearings in plates L L, which are fitted loosely on the axle $c$, and have segment-slots $g$ made in them near their front ends, through which slots screws $h$ pass into the sides of the frame D. (See Fig. 1.) By adjusting these plates L L the shaft H may be raised and lowered and secured at a greater or less height, according to the distance required for the teeth $f$ to work above the surface of the ground in passing around the pulleys G G.

Motion is given the chains F F in the direction indicated by arrow 1 from the shaft H, which is rotated from the rear wheels, B' B', by means of gears $i$ and pawls $j$, the gears and pawls being arranged in such a manner as to cause the chains F to move in the direction of arrow 1 when the machine is drawn forward, but causing the chains to be inoperative when the machine is backed, as in the latter case no motion is imparted to shaft H. This arrangement is not new in itself, substantially the same means being employed on reapers and mowers and other agricultural implements.

The horizontal frame A is attached to the rear axle, $c$, by joints $k$, (see Fig. 1,) which has a shaft, M, fitted transversely to it, the bearings of said shaft being secured to the under surface of its side pieces.

N is a shaft, the bearings of which are in the front ends of bars O, the rear ends of said bars being fitted loosely on the journals of shaft M. The shaft N is parallel with the shaft M, and has pulleys $l\ l$ upon it, around which and the shaft M two chains, P P, pass, connected by rods Q, which have teeth $m$ projecting from them. The shaft M is rotated from the shaft H by means of belts $n\ n$, and the chains P P moved in the direction indicated by arrow 2.

R is a guide-frame, composed of a series of parallel slats or bars, $o$, connected by transverse rods $p$. The side bars of this frame R are connected by pivot-bolts $q$ to the side pieces of the frame A, and the lower ends of the slats or bars $o$ are curved around underneath the shaft M, as shown in Fig. 1. The upper part of the frame R rests upon a crossbar, $r$, attached to the uprights E E.

S is a shaft, which has its bearings $s$ attached to the upper ends of the side pieces of the frame D, is parallel with the shaft J in the upper part of frame D, and is driven from J by a belt, t, in the direction indicated by arrow 3. This shaft has teeth $a^x$ projecting radially from it.

T is an apron, which may be constructed of sheet metal, attached to the front part of the frame A, and has its rear part bent down, so as to clear the teeth m of the rods Q of the chains P P.

As the machine is drawn along the hay is gathered or raked up by the teeth f of the rods K of the chains F F and the teeth m of the rods Q of the chains P P, and the hay is carried up on the frame R by the teeth f and discharged from the upper end of R upon the load. In case any hay should adhere to the teeth f it is discharged therefrom by the toothed shaft S.

This invention has been practically tested, and has been found to operate well. It is simply attached, when required for use, to the rear end of the cart or wagon to be loaded, and when not in use may be stowed compactly away by folding the frame D down on frame A.

Having thus described my invention, I claim as new and desire to secure by Letters Patent—

1. The hay-elevator composed of the endless chains F F P P, having rods K Q attached, provided with teeth f m, in combination with the guide-frame R, all arranged in connection with or applied to the frames A D, mounted on wheels, substantially as and for the purpose set forth.

2. The toothed shaft S, in combination with and arranged relatively to the endless elevators and guide-frame, substantially as and for the purpose specified.

3. The adjustable plates L L, in which the shaft H is fitted, arranged to vibrate upon the axle C, and applied as shown, for adjusting the teeth f of the chains F higher or lower, as may be required.

HOSEA WILLARD.

Witnesses:
GEO. W. GRUNDEY,
N. H. JAQUAYS.